US011753111B2

(12) United States Patent
Elie et al.

(10) Patent No.: US 11,753,111 B2
(45) Date of Patent: Sep. 12, 2023

(54) HYBRID DRIVE

(71) Applicant: Ford Global Technologies, LLC, Dearborn, MI (US)

(72) Inventors: Larry Dean Elie, Ypsilanti, MI (US); Allan Roy Gale, Livonia, MI (US); David Allen Janson, Plymouth, MI (US); Wayne Paul Woodside, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 470 days.

(21) Appl. No.: 16/959,210

(22) PCT Filed: Jan. 2, 2018

(86) PCT No.: PCT/US2018/012104
§ 371 (c)(1),
(2) Date: Jun. 30, 2020

(87) PCT Pub. No.: WO2019/135735
PCT Pub. Date: Jul. 11, 2019

(65) Prior Publication Data
US 2020/0331560 A1    Oct. 22, 2020

(51) Int. Cl.
*B62M 23/02* (2010.01)
*B66F 7/28* (2006.01)

(52) U.S. Cl.
CPC .............. *B62M 23/02* (2013.01); *B66F 7/28* (2013.01)

(58) Field of Classification Search
CPC ....... B66F 7/28; B62K 2204/00; B62K 3/002; B62M 23/02; B62M 7/12

USPC ......................................................... 280/210
See application file for complete search history.

(56) References Cited

U.S. PATENT DOCUMENTS

| 7,182,167 | B2 | 2/2007 | Sasamoto |
| 8,047,321 | B2 | 11/2011 | Martini et al. |
| 2004/0016582 | A1* | 1/2004 | Ho .......................... B62M 7/08 180/181 |
| 2010/0087290 | A1 | 4/2010 | Schoenek et al. |
| 2010/0252341 | A1 | 10/2010 | Shu et al. |
| 2011/0073401 | A1* | 3/2011 | Hanawa ................. B60K 6/485 903/902 |

(Continued)

FOREIGN PATENT DOCUMENTS

| CN | 204037831 U | 12/2014 |
| GB | 2487933 A | 8/2012 |

(Continued)

OTHER PUBLICATIONS

International Search Report of the International Searching Authority for PCT/US2018/012104 dated Mar. 9, 2018.

*Primary Examiner* — Thomas E Worden
*Assistant Examiner* — Sean Patrick Reidy
(74) *Attorney, Agent, or Firm* — Brandon Hicks; Bejin Bieneman PLC

(57) ABSTRACT

A system includes a support arm. The system includes an engine supported by the support arm. The system includes an armature supported by the support arm. The system includes a coupling device disposed around the armature and slidable between a first position in which the coupling device couples the engine to the armature, and a second position in which the coupling device is uncoupled from the engine.

19 Claims, 11 Drawing Sheets

(56) References Cited

U.S. PATENT DOCUMENTS

| | | | |
|---|---|---|---|
| 2011/0087392 A1 | 4/2011 | Kshatriya | |
| 2011/0168465 A1* | 7/2011 | Starr | B60K 7/0007 |
| | | | 180/65.51 |
| 2011/0295454 A1* | 12/2011 | Meyers | B62K 11/10 |
| | | | 180/219 |
| 2012/0181097 A1* | 7/2012 | Hatanaka | B62K 11/10 |
| | | | 180/65.31 |
| 2012/0234282 A1* | 9/2012 | Sakuma | B60W 10/08 |
| | | | 123/179.25 |

FOREIGN PATENT DOCUMENTS

| | | |
|---|---|---|
| JP | 2008044588 A | 2/2008 |
| TW | 200528336 A | 9/2005 |
| TW | 200720115 A | 6/2007 |

\* cited by examiner

HYBRID DRIVE

BACKGROUND

A hybrid powertrain for a vehicle includes an electric motor and an internal combustion engine. Transfer of power from the electric motor and the internal combustion engine to a wheel of the vehicle typically requires the use of one or more clutches, belts, transmissions, etc.

DETAILED DESCRIPTION

Figure 1:
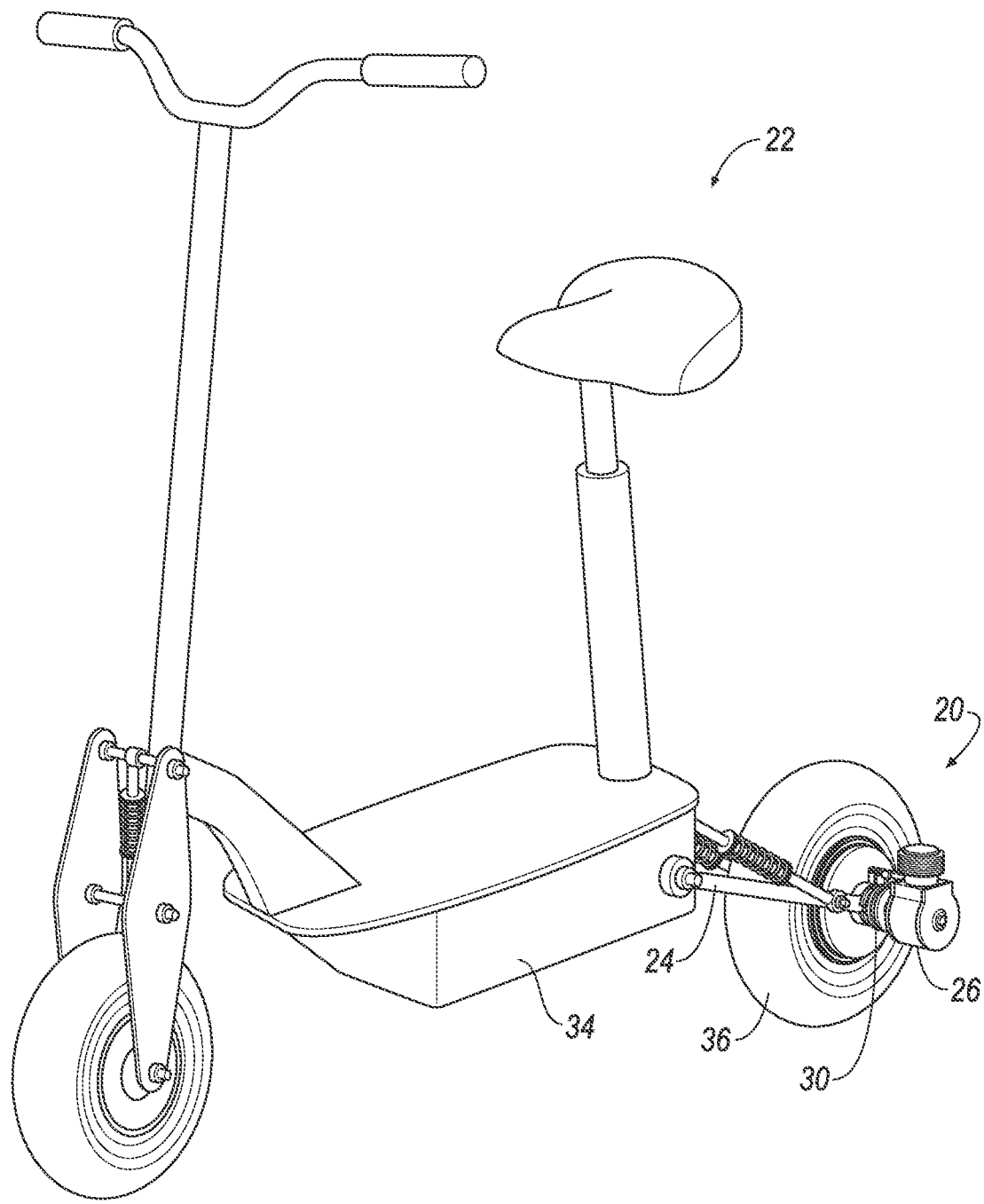
FIG. 1 is a perspective view of a vehicle including a system for proving hybrid power.
Figure 2:
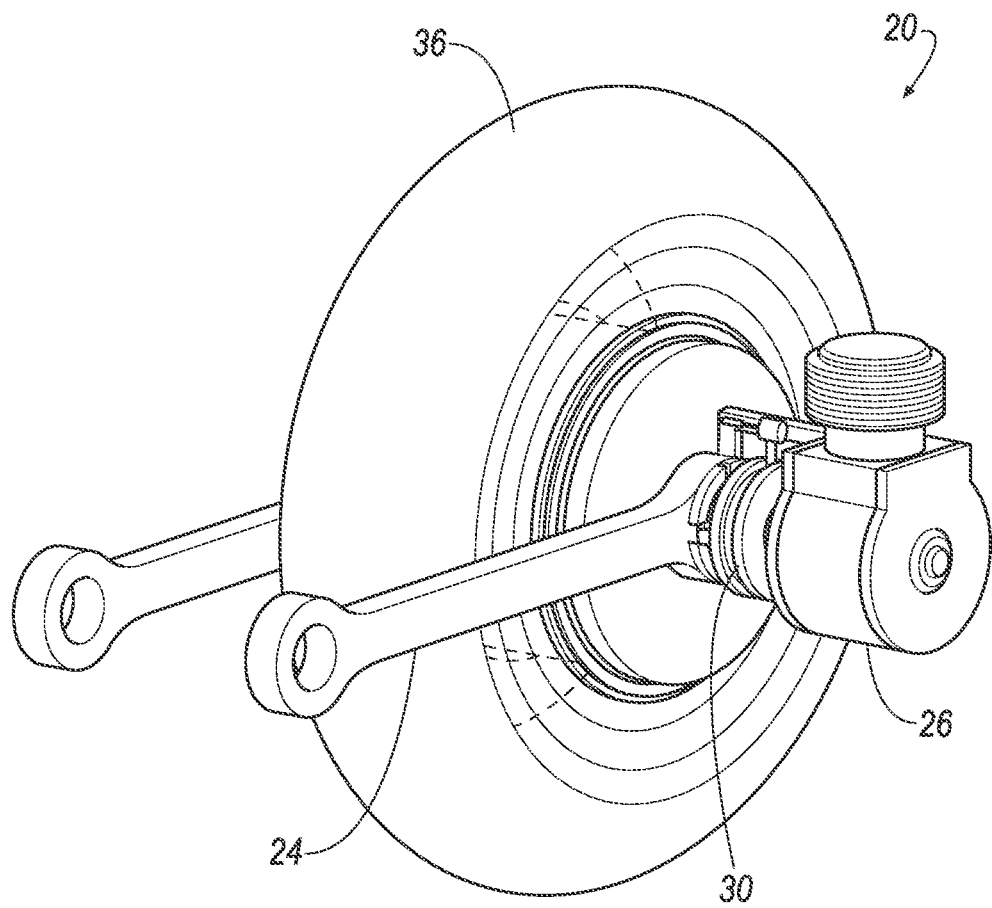
FIG. 2 is a perspective view of the system of FIG. 1.

A system includes a support arm. The system includes an engine supported by the support arm. The system includes an armature supported by the support arm. The system includes a coupling device disposed around the armature and slidable between a first position in which the coupling device couples the engine to the armature, and a second position in which the coupling device is uncoupled from the engine.

The engine may define a notch, and the coupling device may include a tooth engaged with the notch when the coupling device is in the first position.

The coupling device in the second position may couple the armature to the support arm.

The support arm may define a notch, and the coupling device may include a tooth engaged with the notch when the coupling device is in the second position.

The coupling device may be slidable to an intermediary position in which the coupling device is uncoupled from the support arm and the engine.

The system may include a processor and a memory, the memory storing instructions executable by the processor to actuate the engine and the armature to rotate at a same speed when the coupling device is in the intermediary position.

The memory may store instructions executable by the processor to actuate the coupling device to the first position when the engine and the armature rotate at the same speed.

The armature may include a spline and the coupling device may be engaged with the spline to permit movement of the coupling device relative to the armature along an axial axis and to inhibit movement of the coupling device relative to the armature in a rotational direction.

The system may include a magnetic device disposed around the armature.

The magnetic device may include a permanent magnet.

The magnetic device may include an induction coil.

The system may include a wheel supported by the support arm, the magnetic device may be fixed to the wheel.

The magnetic device may be immovably fixed to the wheel.

The system may include a brake supported by the support arm and designed to restrict rotation of the wheel relative to the support arm.

The system may include a processor and a memory, the memory storing instructions executable by the processor to actuate the coupling device to the first position and to actuate the brake to an on state in which the brake inhibits rotation of the wheel.

The memory may store instructions to actuate the armature to rotate when the brake is in the on state and the coupling device is in the first position.

The memory may store instructions to actuate the engine to rotate when the brake is in the on state and the coupling device is in the first position.

The armature may include a permanent magnet.

The armature may include an induction coil.

The system may include a vehicle frame, the support arm may be supported by the vehicle frame.

With reference to the Figures, a system 20 for powering a vehicle 22 includes a support arm 24. The system 20 includes an engine 26 supported by the support arm 24. The system 20 includes an armature 28 supported by the support arm 24. The system 20 includes a coupling device 30 disposed around the armature 28 and slidable between a first position in which the coupling device 30 couples the engine 26 to the armature 28, and a second position in which the coupling device 30 is uncoupled from the engine 26.

The system 20 efficiently provides hybrid power, e.g., via the engine 26 and/or the armature 28, for navigating the vehicle 22. For example, the system 20 may power the vehicle 22 without requiring the use of clutches, belt drives, transmissions, etc., although such components may be used.

As one example, the vehicle 22 may be a scooter, as illustrated in FIG. 1. For the present context, a scooter is a two-wheeled vehicle having a power output below a threshold, e.g., 50 horsepower. An operator of the scooter may stand or sit while operating the scooter. As another example, the vehicle 22 may be any passenger or commercial automobile such as a car, a truck, a sport utility vehicle, a crossover vehicle, a van, a minivan, a taxi, a bus, etc. The vehicle 22 may be any other type of wheeled transportation device, e.g., a motorcycle, a three-wheeled or four-wheeled ATV, a motorized bicycle, etc. The vehicle 22 includes a battery 32, or other electricity storage device. The vehicle 22 may include a frame 34 for supporting various vehicle 22 components. The frame 34 may include various beams, rails, etc. The frame 34 may include components of a body of the vehicle 22, e.g., such as that in a unibody frame construction.

The support arm 24 may have an elongated tubular shape, or any other suitable design. The support arm 24 may be supported by the frame 34. The support arm 24 may be pivotally supported by the frame 34. For example, the support arm 24 may be a component of a suspension system, e.g., permitting relative motion between the frame 34 and other vehicle components, such as a wheel 36, etc. For example, the support arm 24 may be a swing arm of a motorcycle. The support arm 24 may be secured to the frame 34 to inhibit relative motion therebetween, e.g., via welding, fasteners, etc. The support arm 24 may be integral with the frame 34. For example, the support arm 24 may be a chain stay of a bicycle frame.

The support arm 24 may be designed to engage with coupling device 30. For example, the support arm 24 may define a notch 38. The notch 38 may be rectangular, or have any other shape suitable to engage the coupling device 30, e.g., to receive a tooth 76 of the coupling device 30 (described below).

The wheel 36 provides motion to the vehicle 22. For example, power from the engine 26 and/or armature 28 may be transferred to a roadway via the wheel 36. The wheel 36 may include a hub 42 and a tire 44. The wheel 36 is rotatably supported by the support arm 24, i.e., permitting rotation of the wheel 36 relative to the support arm 24, e.g., via a bearing or other low friction support structure.

The system 20 may include a brake 46. The brake 46 is designed to restrict rotation of the wheel 36 relative to the support arm 24, e.g., to slow and/or stop the vehicle 22. The brake 46 may be a disc brake, a drum brake, a band brake, etc. The brake 46 can include an electronic control unit (ECU) or the like that actuates the brake 46 to resist the motion of the vehicle 22, e.g., upon an instruction from a computer 48 and/or from a human driver. The brake 46 may actuate to an on state in which the brake 46 inhibits rotation of the wheel 36. The brake 46 may be supported by the support arm 24, e.g., via one or more fasteners, support brackets, etc.

The engine 26 translates stored energy in the form of fuel into rotary motion of a driveshaft 50. The engine 26 may include spark plugs, fuel injectors, a carburetor, etc. The engine 26 may include one or more pistons and cylinders, a crankshaft, etc. The engine 26 may be of any other suitable design, e.g., a piston-less rotary engine (also known as a Wankel engine), etc. The engine 26 may be in communication with, and receive input from, the computer 48 and/or from a human operator.

The engine 26 is supported by the support arm 24. For example, the engine 26 may be fixed to the support arm 24 with one or more fasteners, mounts, brackets, etc.

The engine 26 may be designed to engage with the coupling device 30. As one example, the engine 26 may define a notch 52. The notch 52 may be defined in the driveshaft 50. The notch 52 may be rectangular, or have any other shape suitable to engage the coupling device 30, e.g., to receive one of the teeth 76 of the coupling device 30.

The armature 28 includes a driveshaft 54. The driveshaft 54 may be an elongated cylindrical member. The driveshaft 54 extends along an axial axis A of the armature 28. The driveshaft 54 may be made of metal, or any other suitable material. The driveshaft 54 enables the armature 28 to be rotatably supported, e.g., to rotate about the axial axis A, and allows torque to be transmitted to and from the armature 28.

The armature 28 is supported by the support arm 24. The armature 28 is rotatable relative to the support arm 24. For example, the driveshaft 54 of the armature 28 may be supported by the support arm 24 via one or more bearings, bushings, etc.

Figure 3:
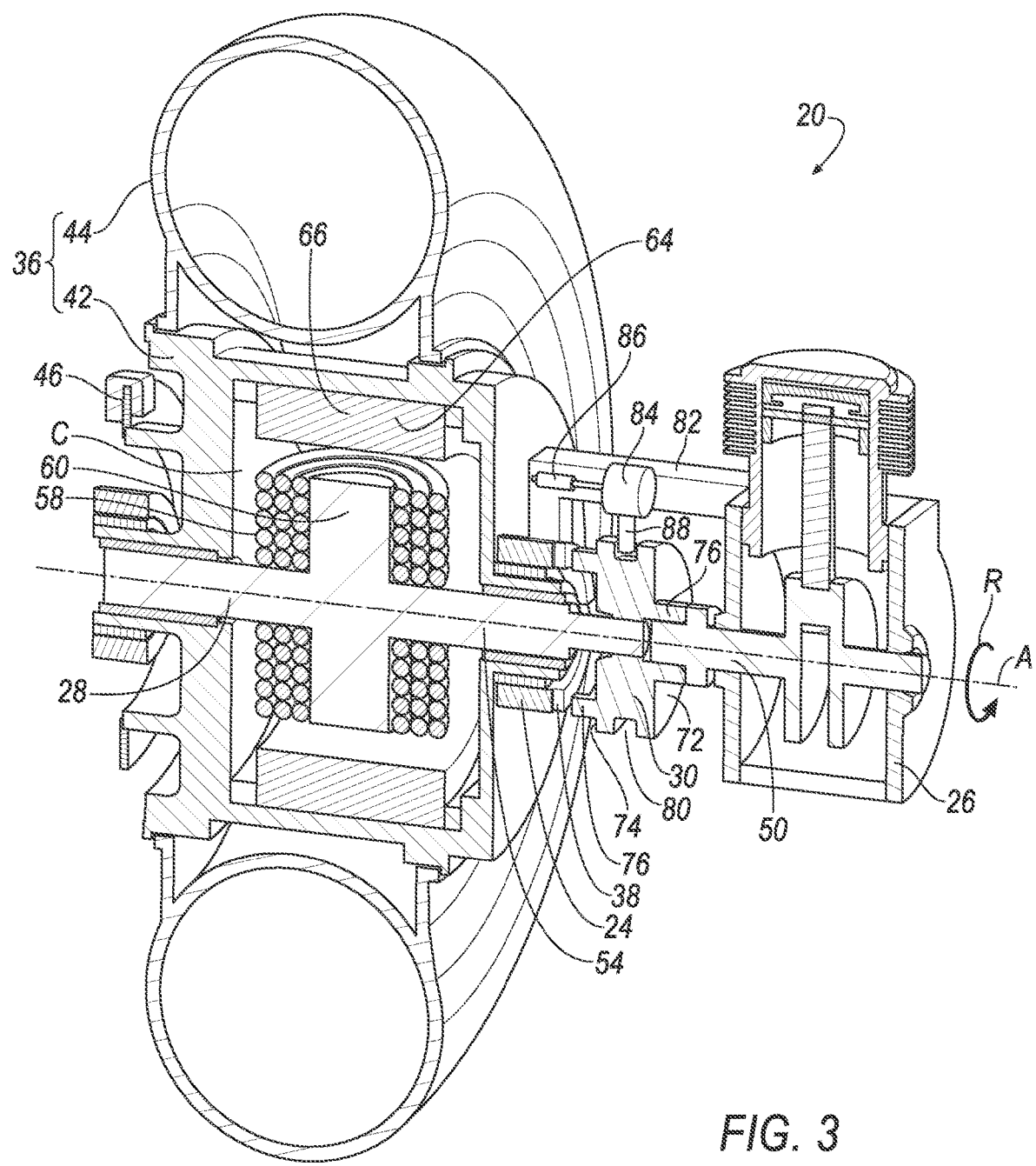
FIG. 3 is a perspective cross section of the system of FIG. 1.
Figure 4:
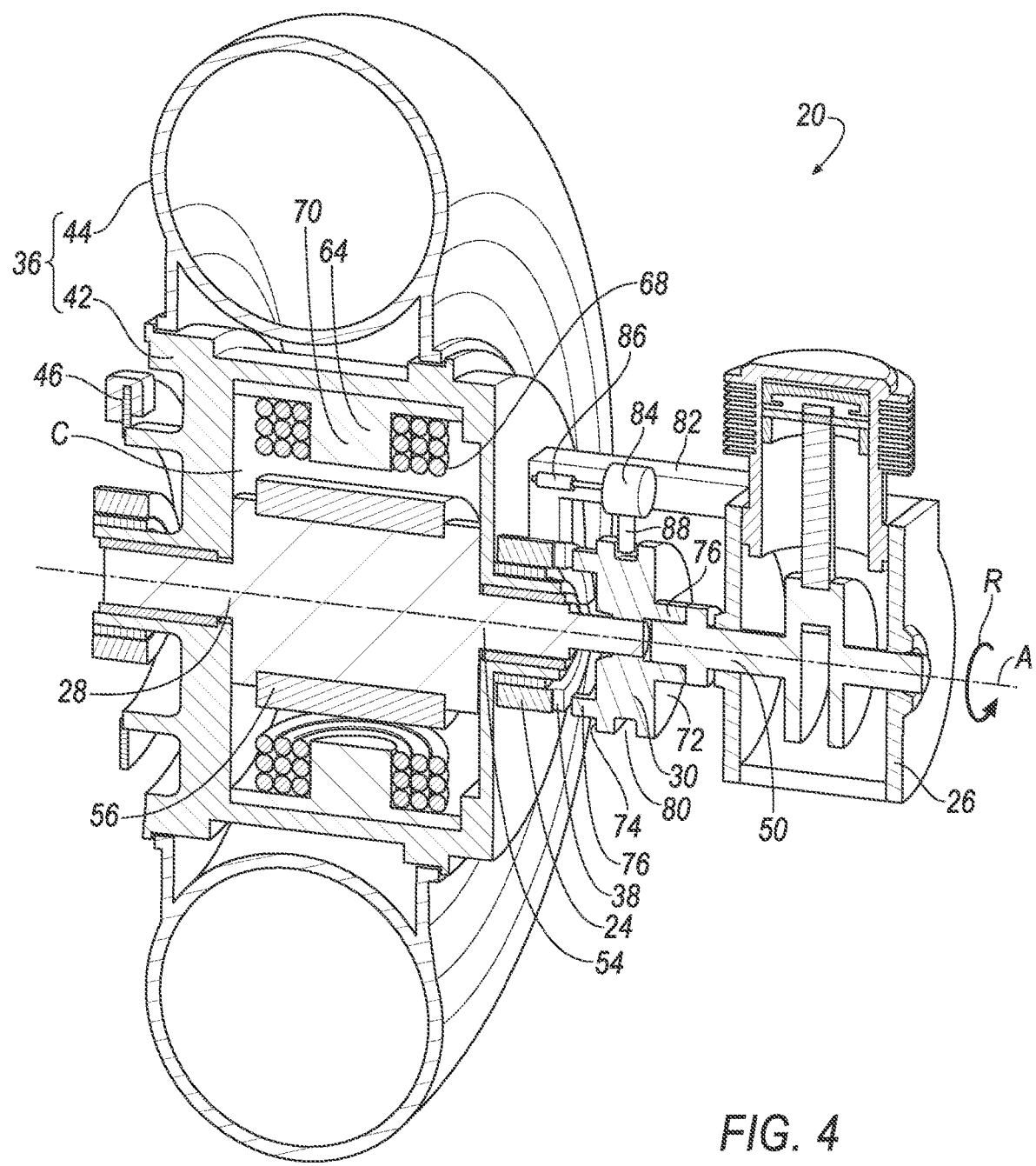
FIG. 4 is a perspective cross section of another embodiment of the system of FIG. 1.
Figure 5:
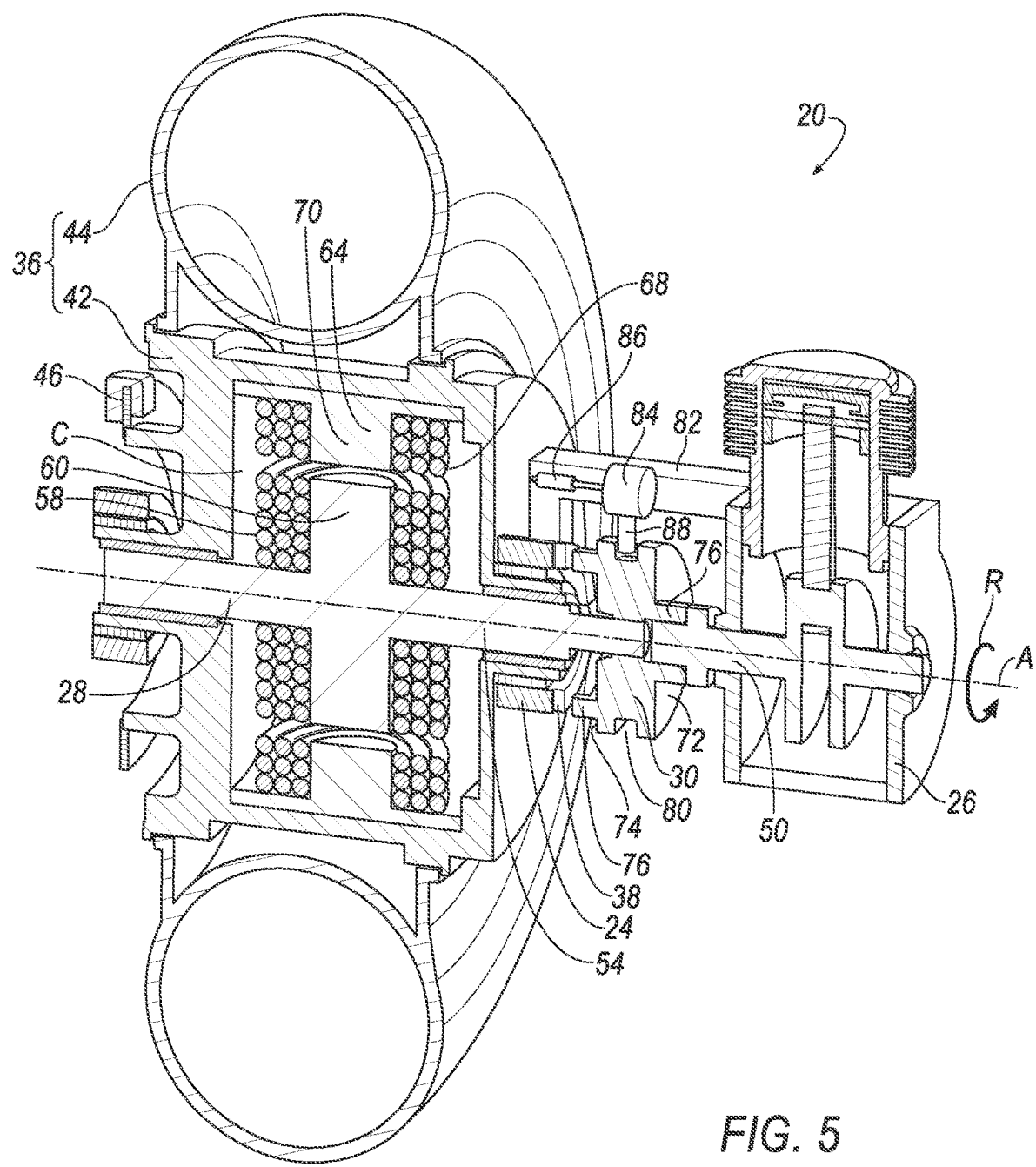
FIG. 5 is a perspective cross section of another embodiment of the system of FIG. 1.
Figure 6:
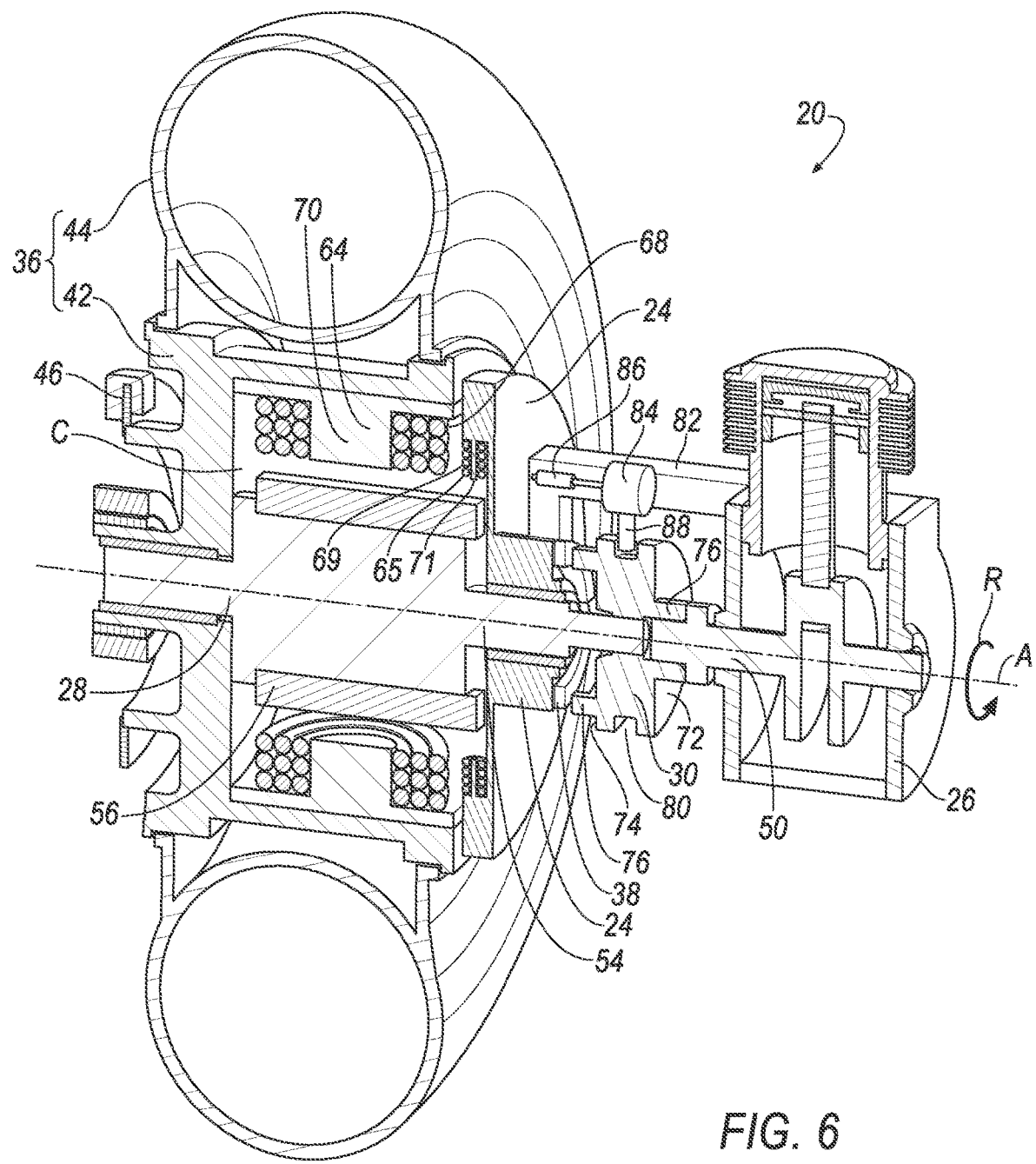
FIG. 6 is a perspective cross section of another embodiment of the system of FIG. 1.
Figure 7:
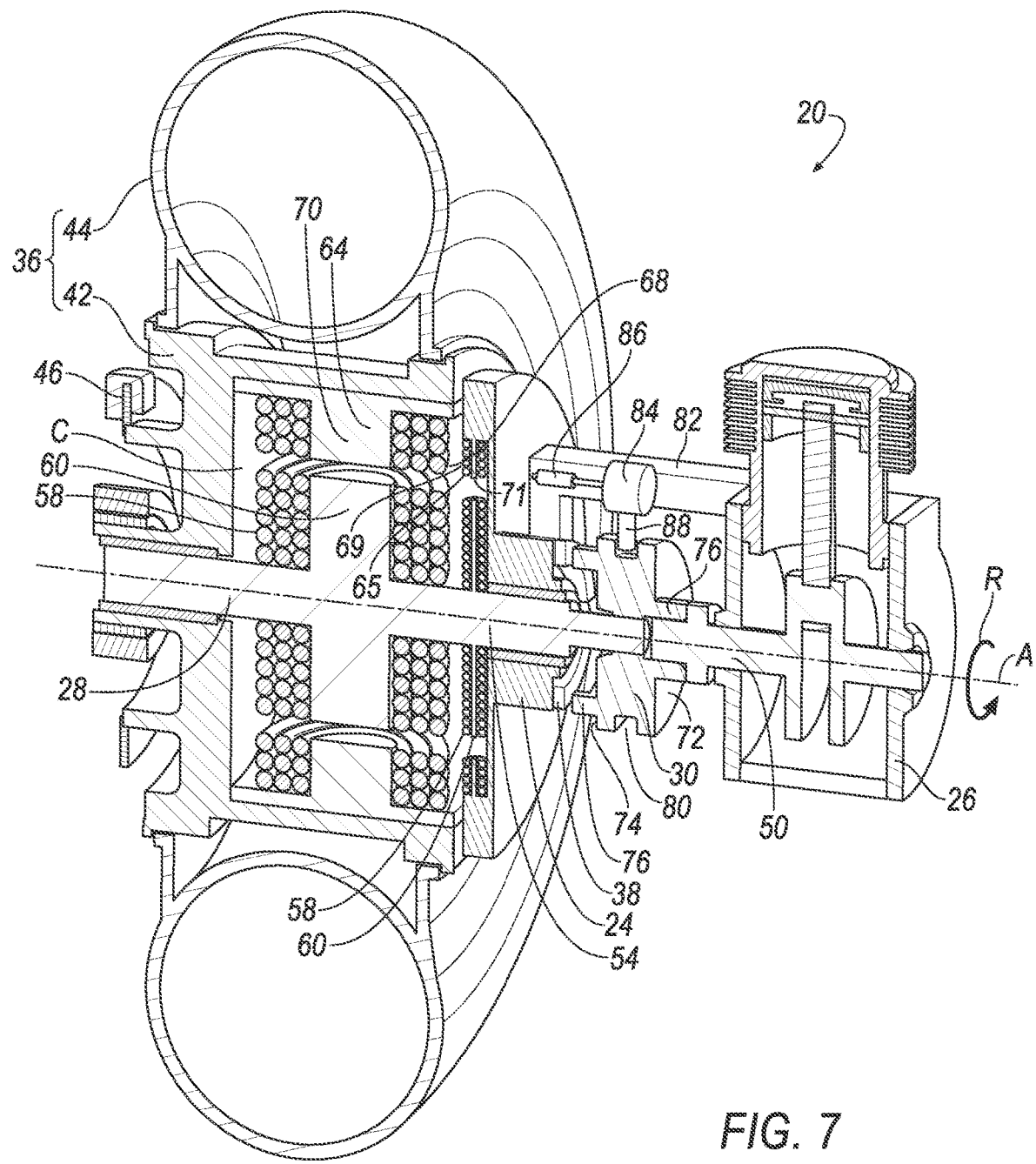
FIG. 7 is a perspective cross section of another embodiment of the system of FIG. 1.

The armature 28 produces a magnetic field. For example, the armature 28 may include one or more permanent magnets 56, e.g., supported by the driveshaft 54, as shown in FIGS. 4 and 6. The magnets 56 may be fixed to the driveshaft 54, e.g., with an adhesive, a fastener, etc. As another example, the armature 28 may include one or more induction coils 58 to produce the magnetic field, as shown in FIGS. 3, 5, and 7. Each induction coil 58 of the armature 28 may be disposed around a core 60. The core 60 may be fixed to the driveshaft 54 of the armature 28, e.g., with one or more fasteners, etc. The core 60 and the driveshaft 54 may be monolithic, i.e., a single piece with no seams, joints, fasteners, or adhesives holding the core 60 and the driveshaft 54 together. The core 60 may be a ferromagnetic material. The induction coils 58 of the armature 28 produce a magnetic field when they are supplied with an electrical current, e.g., a direct current voltage, e.g., from the battery 32. The induction coils 58 of the armature 28 may be in electrical communication with the battery 32, e.g., via wires, brushes, conductive bearings, etc. The computer 48 may control the electricity supplied to the induction coils 58 from the battery 32, e.g., an amount of voltage of the electrical current, a timing of the electrical current, e.g., suppling the electrical current at a specific frequency.

The armature 28 may produce a second magnetic field. For example, the armature may include multiple induction coils 58 and cores 60 along the axial axis A (shown in FIG. 7) and/or multiple permanent magnets along the axial axis A (not shown).

Figure 11:
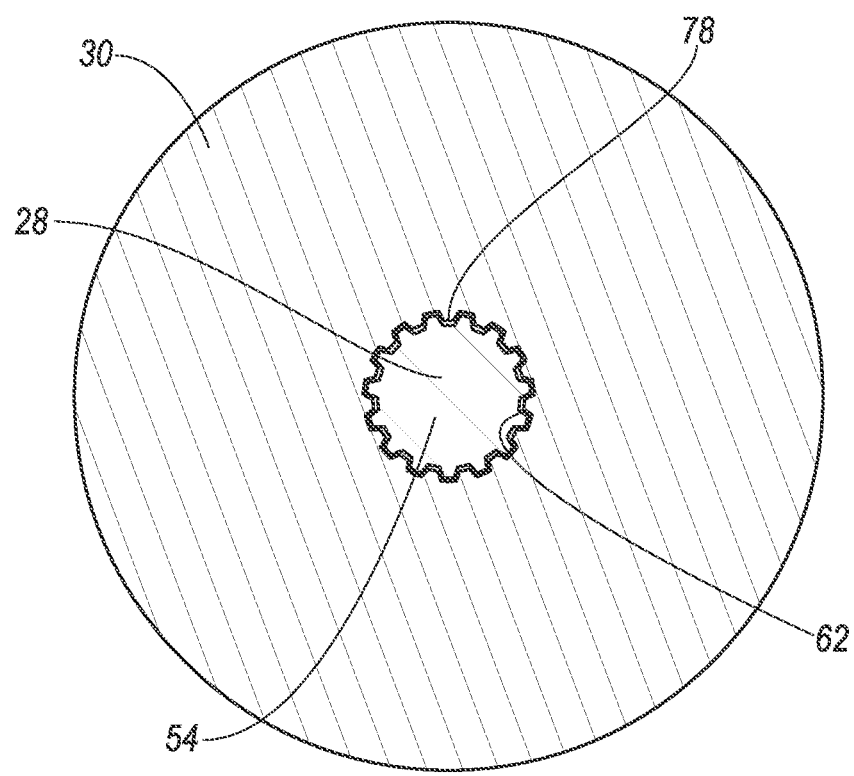
FIG. 11 is a cross section of the coupling of FIG. 8 and an armature of the system.

The armature 28 may include one or more splines 62, shown in FIG. 11. The splines 62 may extend along the axial axis A. The splines 62 may be located on the driveshaft 54 of the armature 28.

The system 20 may include a first magnetic device 64. The first magnetic device 64 produces a magnetic field. For example, the first magnetic device 64 may include a permanent magnet 66, as shown in FIG. 3. For example, the first magnetic device 64 may include one or more induction coils 68, as shown in FIGS. 4, 5, 6, and 7. Each of the induction coils 68 of the first magnetic device 64 may be disposed around a core 70. The induction coils 68 of the first magnetic device 64 produce a magnetic field when they are supplied with an electrical current, as described above for the induction coils 58 of the armature 28. The induction coils 68 of the first magnetic device 64 may be in electrical communication with the battery 32, e.g., via wires, brushes, conductive bearings, etc. The computer 48 may control the electricity supplied to the induction coils 68 from the battery 32, e.g., an amount of voltage of the electrical current, a timing of the electrical current, e.g., suppling the electrical current at a specific frequency.

The first magnetic device 64 may be supported by the wheel 36. The first magnetic device 64 may be fixed to the wheel 36, e.g., fixed to the hub 42 via fasteners, an adhesive, etc. The first magnetic device 64 may be immovably fixed to the wheel 36, e.g., to inhibit relative translation and rotation therebetween.

The first magnetic device 64 may be positioned relative to the armature 28 such that the armature 28 and the first magnetic device 64 may collectively function as a motor or as a generator. For example, the first magnetic device 64 may be positioned relative to the magnet 56 of the armature 28, as shown in FIGS. 4 and 6. As another example, the first magnetic device 64 may be positioned relative to one of the induction coils 58 of the armature 28, as shown in FIGS. 5 and 7.

The first magnetic device 64 may be disposed around the armature 28. The first magnetic device 64 may be spaced from the armature 28. For example, the armature 28 may be disposed within a cavity C defined by the hub 42 of the wheel 36, e.g., at a center of the hub 42.

For example, when the armature 28 includes the permanent magnet 56 and the first magnetic device 64 includes the induction coils 68, the armature 28 and first magnetic device 64 may collectively function as a motor by providing an electrical current to the induction coils 68 of the first magnetic device 64. The electrical current may be provided intermittently at a specific frequency. For example, e.g., the computer 48 may control the frequency of the electrical current such that the induction coils 68 of the first magnetic device 64 are provided with electricity to produce a magnetic field and are urged toward the permanent magnet 56 of the armature 28 when the armature 28 and the first magnetic device 64 are in a certain rotational position relative to each other, and such that the induction coils 68 of the first magnetic device 64 are not provided with electricity and do not produce a magnetic field when the armature 28 and the first magnetic device 64 are in another certain rotational position relative to each other, e.g., such as an intermittently provided electrical current to a brushless motor.

For example, when the armature 28 includes the permanent magnet 56 and the first magnetic device 64 includes the induction coil 68, the armature 28 and first magnetic device 64 may collectively function as a generator by rotating the armature 28 and/or the first magnetic device 64 relative to each other. For example, the armature may be rotated with the engine 26. For example, the first magnetic device 64 may be rotated via rotation of the wheel 36, e.g., as the vehicle 22 travels. The generated electricity may be used to charge the battery 32.

For example, when the armature 28 includes the induction coil 58 and the first magnetic device 64 includes the permanent magnet 66, the armature 28 and first magnetic device 64 may collectively function as a motor by providing an electrical current to the induction coils 58 of the armature 28. The electrical current may be provided intermittently at a specific frequency. For example, e.g., the computer 48 may control the frequency, as described above. Alternately, the electrical current may be continuously provided, e.g., in response to an instruction from the computer 48, and an electrical connection to the induction coils 58 of the armature 28 may be intermittently connected and disconnected, such as in a brushed motor.

For example, when the armature 28 includes the induction coil 58 and the first magnetic device 64 includes the permanent magnet 66, the armature 28 and first magnetic device 64 may collectively function as a generator by rotating the armature 28 and/or the first magnetic device 64 relative to each other, as described above. The generated electricity may be used to charge the battery 32.

For example, when the armature 28 includes the induction coil 58 and the first magnetic device 64 includes the induction coil 68, the armature 28 and first magnetic device 64 may collectively function as a motor by providing an electrical current to the induction coil 58 of the armature 28 and an electrical current to the induction coil 68 of the first magnetic device 64. The electrical currents may be provided intermittently at specific frequencies. For example, the computer 48 may control the frequencies, as described above.

For example, when the armature 28 includes the induction coil 58 and the first magnetic device 64 includes the induction coil 68, the armature 28 and first magnetic device 64 may collectively function as a generator by providing an electrical current to the induction coil 58 of the armature 28 or an electrical current to the induction coil 68 of the first magnetic device 64 to generate a magnetic field, while simultaneously rotating the armature 28 and/or the first magnetic device 64 relative to each other, as described above. The generated electricity may be used to charge the battery 32.

The system 20 may include a second magnetic device 65. The second magnetic device 65 may be supported by the support arm 24. For example, the second magnetic device 65 may include an induction coil 69 and core 71 fixed to the support arm 24, as shown in FIGS. 6 and 7. For example, the second magnetic device 65 may include a permanent magnet fixed to the support arm 24 (not shown).

The second magnetic device 65 may be positioned relative to the armature 28 such that the armature 28 and the second magnetic device 65 may collectively function as a motor or as a generator, e.g., as described above for the first magnetic device 64. For example, the second magnetic device 65 may be positioned relative to the magnet 56 of the armature 28, as shown in FIG. 6. As another example, the second magnetic device 65 may be positioned relative to one of the induction coils 58 of the armature 28, as shown in FIG. 7.

The armature 28 and the first magnetic device 64 may operate as a motor, while the armature 28 and the second magnetic device 65 operate as a generator, and vice versa. For example, the induction coil 69 of the support arm 24 may be induced to generate electricity as the armature 28 rotates and the permanent magnet 56 of the armature 28 passes the induction coil 69 of the support arm 24, while the induction coil 68 of the wheel 36 may be provided an electric impulse to generate a magnetic field the permanent magnet 56 of the armature 28 approaches the induction coil 68 of the wheel 36, and vice versa.

Alternately, the armature 28 and the first magnetic device 64, and the armature 28 and the second magnetic device 65, may simultaneously operate as a motor or as a generator. For example, the induction coil 68 of the wheel 36 and the induction coil 69 of the support arm 24 may be induced to produce electricity by rotating the armature 28 and causing the permanent magnet 56 to pass the induction coils 68, 69. For example, the induction coil 68 of the wheel 36 and the induction coil 69 of the support arm 24 may be provided electric impulses to generate magnetic fields as the permanent magnet 56 approaches.

Although various combinations of types of armatures 28 and first and second magnetic devices 64, 65 are shown, it is to be understood that other combinations are not shown in the Figures but may be used.

For example, an armature may include a first permanent magnet aligned with an induction coil supported by a wheel, and may include a second permanent magnet aligned with an induction coil supported by a support arm.

As another example, an armature may include a permanent magnet aligned with an induction coil supported by a wheel, and may include an induction coil aligned with a permanent magnet supported by a support arm.

As another example, an armature may include a permanent magnet aligned with an induction coil supported by a wheel, and may include an induction coil aligned with an induction coil supported by a support arm.

As another example, an armature may include an induction coil aligned with a permanent magnet supported by a wheel, and may include a permanent magnet aligned with an induction coil supported by a support arm.

As another example, an armature may include an induction coil aligned with an induction coil supported by a wheel, and may include a permanent magnet aligned with an induction coil supported by a support arm.

As another example, an armature may include a first induction coil aligned with a permanent magnet supported by a wheel, and may include a second induction coil aligned with a permanent magnet supported by a support arm.

As another example, an armature may include a first induction coil aligned with a permanent magnet supported by a wheel, and may include a second induction coil aligned with an induction coil supported by a support arm.

As another example, an armature may include a first induction coil aligned with an induction coil supported by a wheel, and may include a second induction coil aligned with a permanent magnet supported by a support arm.

The coupling device 30 may have a hollow cylindrical shape. The coupling device 30 may extend from between a first end 72 and a second end 74 opposite the first end 72. The coupling device 30 may include one or more teeth 76. The teeth 76 may be located at the first end 72 and/or the second end 74 of the coupling device 30. The teeth 76 may extend from the first end 72 and/or the second end 74 along the axial axis A. The coupling device 30 may include one or more splines 78, shown in FIG. 11. The splines 78 may be located at an interior of the hollow cylindrical shape and extending between the first end 72 and the second end 74. The coupling device 30 may include a channel 80. The channel 80 may extend around a circumference of an exterior of the coupling device 30.

The coupling device 30 is disposed around the armature 28, e.g., the driveshaft 54 of the armature 28 may be located with the interior of the hollow cylindrical shape of the coupling device 30. The coupling device 30 may be positioned such that the first end 72 is proximate the engine 26, i.e., a distance between the first end 72 and the engine 26 is less than a distance between the second end 74 and the engine 26. The coupling device 30 may be positioned such that the second end 74 is proximate the support arm 24.

The coupling device 30 is engaged with the spline 62 of the armature 28 to permit movement of the coupling device 30 relative to the armature 28 along the axial axis A and to inhibit movement of the coupling device 30 relative to the armature 28 in a rotational direction R. For example, the coupling device 30 may be sized to slip-fit around the driveshaft 54, e.g., to permit movement of the coupling device 30 relative to the driveshaft 54 along the axial axis A. For example, the spline 78 of the coupling device 30 may abut the spline 62 of the armature 28, e.g., to inhibit movement of the coupling device 30 relative to the armature 28 in the rotational direction R, e.g., about the axial axis A.

Figure 8:
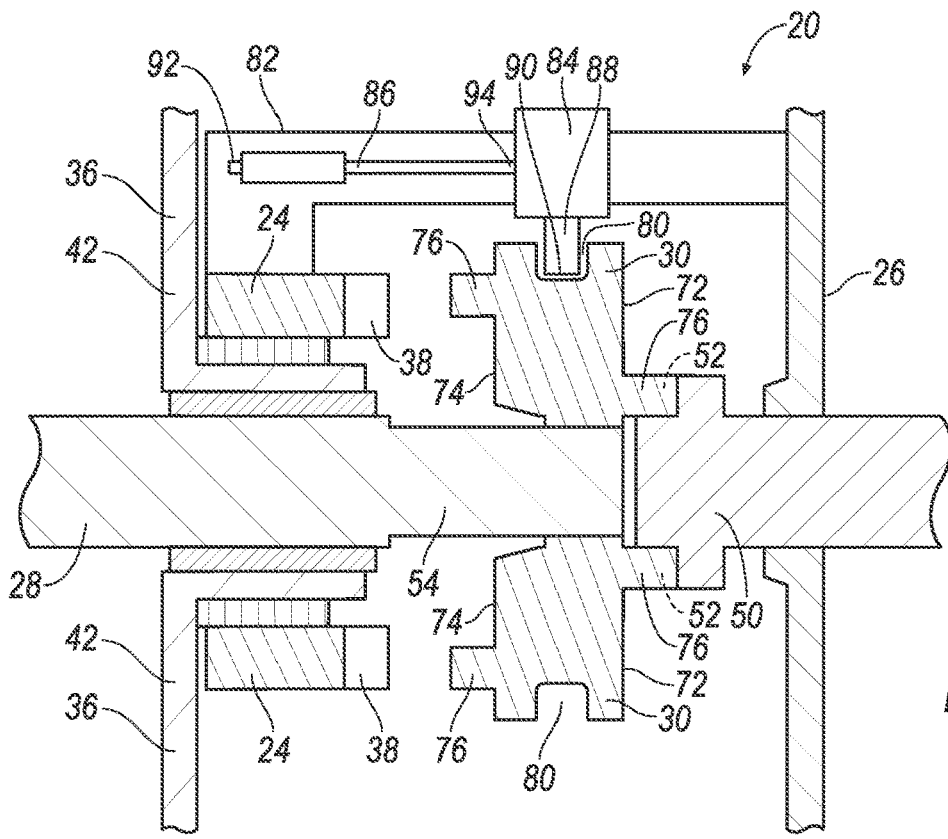
FIG. 8 is a cross section of the system of FIG. 1 showing a coupling in a first position.
Figure 9:
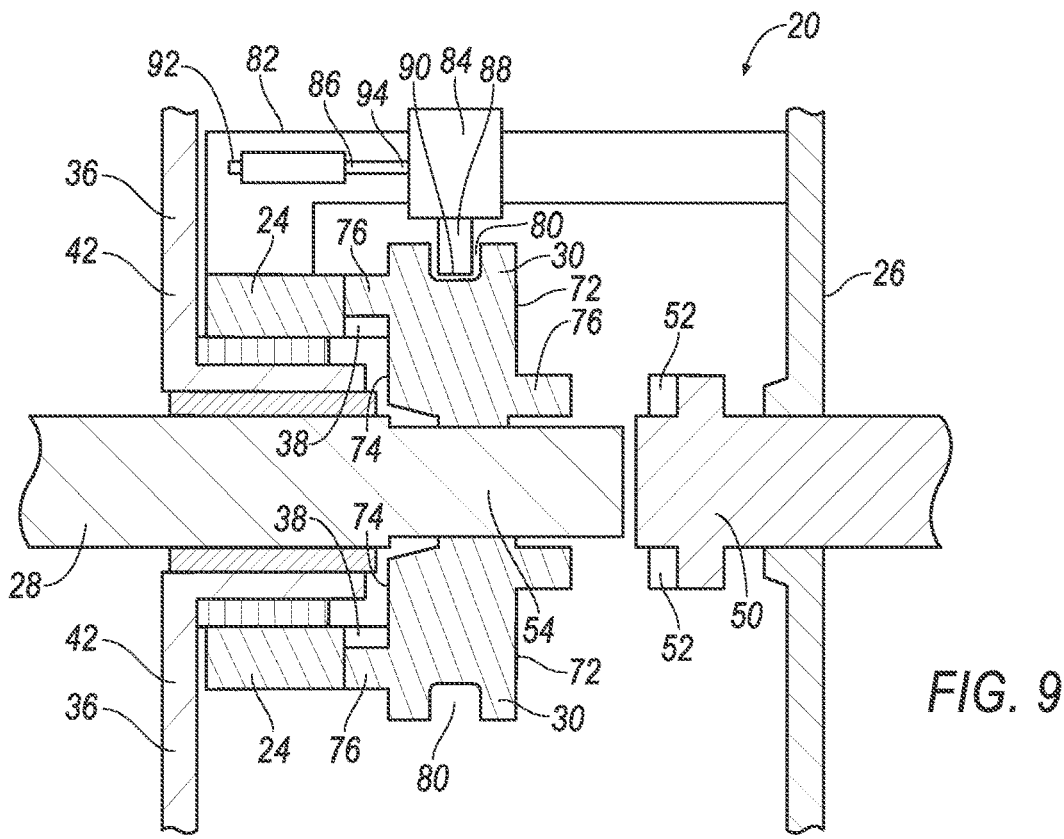
FIG. 9 is a cross section of the system of FIG. 1 showing the coupling in a second position.
Figure 10:
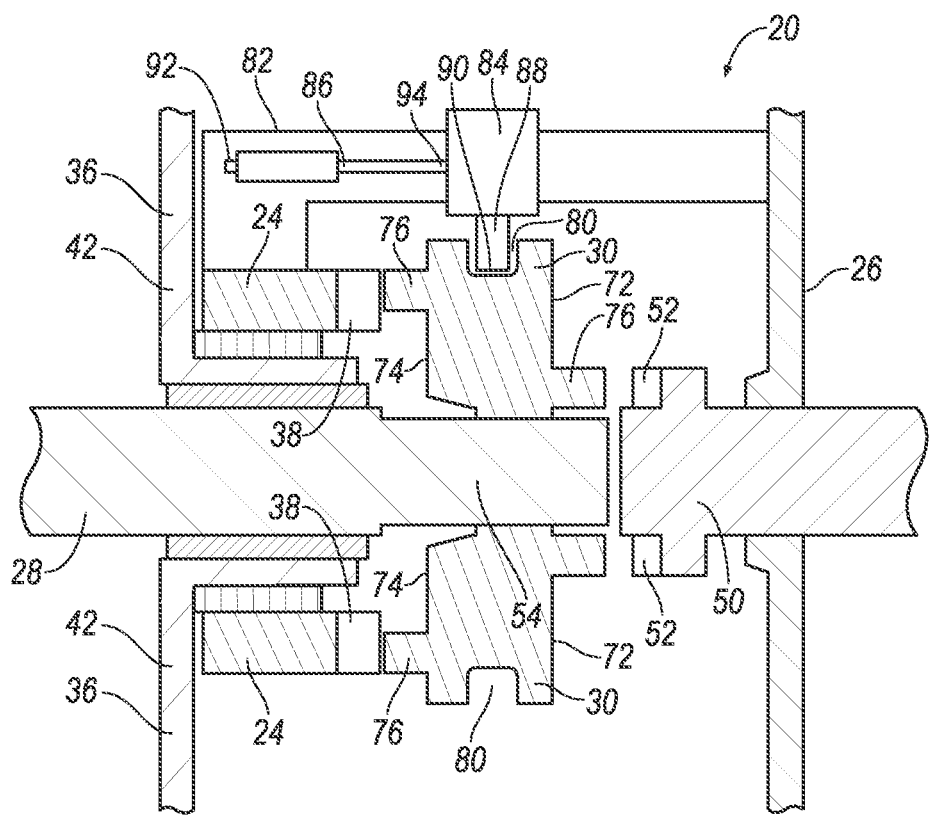
FIG. 10 is a cross section of the system of FIG. 1 showing the coupling in an intermediary position.

The coupling device 30 is slidable between the first position, shown in FIG. 8, and the second position, shown in FIG. 9. The coupling device 30 may be slidable to an intermediary position, as shown in FIG. 10. The intermediary position is between the first position and the second position.

The coupling device 30 in the first position couples the engine 26 to the armature 28. For example, the tooth 76 at the first end 72 of the coupling device 30 may engage, e.g., may be disposed within, the notch 52 of the engine 26 when the coupling device 30 is in the first position. Coupling the engine 26 and the armature 28 inhibits movement of the coupling device 30 relative to the engine 26 in the rotational direction R, e.g., about the axial axis A. To put it another way, when the engine 26 and armature 28 are coupled, rotation of the engine 26, e.g., of the driveshaft 50 of the engine 26, causes rotation of the driveshaft 54 of the armature 28, and vice versa.

The coupling device 30 in the first position is uncoupled from the support arm 24. For example, when the coupling device 30 is in the first position the tooth 76 at the second end 74 of the coupling device 30 may be disposed completely outside the notch 38 of the support arm 24. Uncoupling the coupling device 30 from the support arm 24 permits movement of the coupling device 30, and the armature 28, relative to the support arm 24 in the rotational direction R, e.g., about the axial axis A.

The coupling device 30 in the second position is uncoupled from the engine 26. For example, the tooth 76 at the first end 72 of the coupling device 30 may be disposed completely outside the notch 52 of the engine 26 when the coupling device 30 is in the second position. Uncoupling the coupling device 30 from the engine 26 permits movement of the coupling device 30 relative to the engine 26 in the rotational direction R, e.g., about the axial axis A. To put it another way, when the coupling device 30 is uncoupled from the engine 26, rotation of the engine 26, e.g., of the driveshaft 50 of the engine 26, does not cause rotation of the coupling device 30 and the armature 28, and vice versa.

The coupling device 30 in the second position may couple the armature 28 to the support arm 24. For example, the tooth 76 at the second end 74 of the coupling device 30 may engage, e.g., may be disposed within, the notch 38 of the support arm 24 when the coupling device 30 is in the second position. Coupling the support arm 24 and the armature 28 inhibits movement of the coupling device 30 relative to the support arm 24 in the rotational direction R, e.g., about the axial axis A. To put it another way, when the support arm 24 and the armature 28 are coupled, rotation of the armature 28 is inhibited.

The coupling device 30 in the intermediary position is uncoupled from the support arm 24 and the engine 26. For example, when the coupling device 30 is in the intermediary position the tooth 76 at the first end 72 of the coupling device 30 may be disposed completely outside the notch 52 of the engine 26 and the tooth 76 at the second end 74 of the coupling device 30 may be disposed completely outside the notch 38 of the support arm 24. Uncoupling the coupling device 30 from the engine 26 and the support arm 24 permits movement of the coupling device 30, and the armature 28, relative to the engine 26 and the support arm 24 in the rotational direction R, e.g., about the axial axis A.

The system 20 may include a shift rail 82, a shift fork 84, and an actuator 86, as shown in FIGS. 3 through 10, that may move the coupling device 30 between the first position, the second position, and the intermediary position.

The shift rail 82 may be an elongated shaft. The shift rail 82 may be supported by the support arm 24. The shift rail 82 and the support arm 24 may be monolithic. The shift rail 82 may include channels, grooves, tracks, etc., e.g., to enable translational movement of the shift fork 84 along the shift rail 82. The shift rail 82 may support the engine 26.

The shift fork 84 may be slidably supported by the shift rail 82. The shift fork 84 may include an extension 88 that extends to a distal end 90. The distal end 90 of the extension 88 may be disposed within the channel 80 of the coupling device 30.

The actuator 86 includes a first end 92 and a second end 94 opposite the first end 92. The first end 92 may be fixed to the shift rail 82 and the second end 94 may be fixed to the shift fork 84, e.g., with a fastener, etc. The actuator 86 may be actuated to change a length of the actuator 86, e.g., in response to an instruction the computer 48. For example, the actuator 86 may be an electromagnetic solenoid, linear servo, or any other actuation device capable of moving the shift fork 84. Change in length of the actuator 86 slides the shift fork 84 along the shift rail 82 and changes a position of the coupling device 30. Other systems and/or devices may be used to move the coupling device 30 between the first position, the second position, and the intermediary position.

Figure 12:
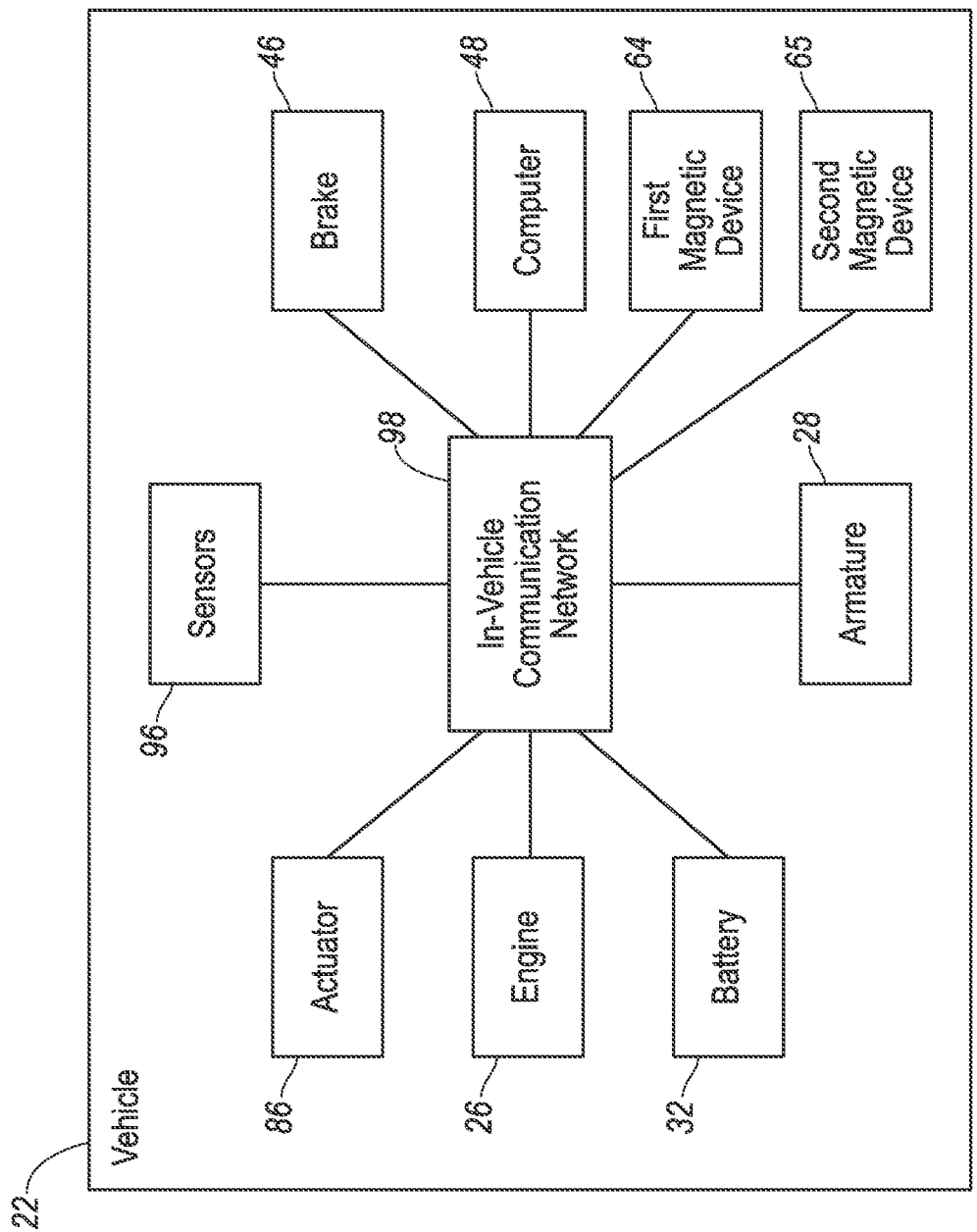
FIG. 12 is a block diagram of the vehicle of FIG. 1.

With refence to FIG. 12, sensors 96 may detect internal states of the system 20, for example, wheel speed and position sensors, brake sensors, traction control sensors, and engine variable sensors. For example, one or more optical sensors and/or Hall effect sensors may detect a rotational speed, the rotational direction R, and a rotational position of the driveshaft 54 of the armature 28, of the wheel 36, and the driveshaft 50 of the engine 26, e.g., relative to the support arm 24.

The system 20 and/or vehicle 22 may include a communication network 98. The communication network 98 includes hardware, such as a communication bus, a wiring harness, etc., for facilitating communication and power among vehicle 22 and/or system 20 components. The communication network 98 may facilitate wired or wireless communication among the components in accordance with a number of communication protocols such as controller area network (CAN), Ethernet, WiFi, Local Interconnect Network (LIN), and/or other wired or wireless mechanisms.

The computer 48, implemented via circuits, chips, antennas and/or other electronic components, is included in the system 20 and/or vehicle 22 for carrying out various operations and processes, including those described herein. The computer 48 is a computing device that generally includes the processor and the memory, the memory including one or more forms of computer-readable media, and storing instructions executable by the processor for performing various operations and processes, including those disclosed herein. The computer 48 may be programmed by storing instructions on the memory that are executable by the processor.

The memory of the computer 48 further generally stores remote data received via various communications mechanisms; e.g., the computer 48 is generally configured for communications with components on the communication network 98, e.g., a controller area network (CAN) bus, and for using other wired or wireless protocols to communicate with devices outside the vehicle 22, etc., e.g., via Universal Serial Bus (USB), Bluetooth8®, IEEE 802.11 (colloquially referred to as WiFi®), satellite telecommunication protocols, and cellular protocols such as 3G, LTE, etc. Via the communication network 98 the computer 48 may transmit messages to various devices in the vehicle 22 and/or system 20, and/or receive messages from the various devices, e.g., the brake 46, the engine 26, the armature 28, the first magnetic device 64, the second magnetic device 65, the actuator 86, the sensors 96, etc., e.g., as discussed herein. Although one computer 48 is shown for ease of illustration, it is to be understood that the computer 48 could include, and various operations described herein could be carried out by, one or more computing devices.

The computer 48 may be programmed to actuate the engine 26 and the armature 28 to rotate at a same speed when the coupling device 30 is in the intermediary position. For example, the computer 48 may identify the rotational speeds of the armature 28 and the driveshaft 50 of the engine 26, e.g., based on information received from the sensors 96 via the communication network 98. Based on the identified rotational speeds, the computer 48 may increase, or decrease, the rotational speed of the armature 28 and/or the engine 26. For example, the computer 48 may vary the voltage and/or the frequency of the electrical current provided to the induction coil 58 of the armature 28, the induction coil 68 of the first magnetic device 64, and/or the induction coil 69 of the second magnetic device 65, as described herein. For example, the computer 48 may instruct the engine 26, e.g., via the communication network 98, to vary a timing of actuation of the spark plugs, fuel injectors, etc., to vary an amount of fuel provided to the engine 26, e.g., via the fuel injectors, carburetor, etc.

The computer 48 may be programmed to actuate the coupling device 30 to the first position when the engine 26 and the armature 28 rotate at the same speed. For example, when the engine 26 and armature 28 are rotating at the same speed, e.g., as identified by the computer 48 based on information from the sensors 96, the computer 48 may instruct the actuator 89 to lengthen and move the coupling device 30 to the first position.

The computer 48 may be programmed to actuate the coupling device 30 to the first position and to actuate the brake 46 to the on state in which the brake 46 inhibits rotation of the wheel 36. For example, the computer 48 may instruct the actuator 86, e.g., via the communication network 98, to move the coupling device 30 to the first position, and may instruct the brake 46, e.g., via the communication network 98, to the on state.

The computer 48 may be programmed to actuate the armature 28 to rotate when the brake 46 is in the on state and the coupling device 30 is in the first position, e.g., to start the engine 26. For example, the computer 48 may provide an electrical current to the induction coil 58 of the armature 28, the induction coil 68 of the first magnetic device 64 and/or the induction coil 69 of the second magnetic device 65, e.g., from the battery 32 and as described herein, while the brake 46 is in the on state.

The computer 48 may be programmed to actuate the engine 26 to rotate when the brake 46 is in the on state and the coupling device 30 is in the first position, e.g., to operate the armature 28 and the first magnetic device 64 and/or the second magnetic device 65 as a generator. For example, the computer 48 may instruct the engine 26, e.g., via the communication network 98, to actuate the spark plugs, fuel injectors, etc., to rotate the driveshaft 50 of the engine 26.

The computer 48 may be programmed to navigate the vehicle 22 with power from the engine 26. For example, the computer 48 may instruct the actuator 86 to move the coupling device 30 to the first position, and may instruct the engine 26 to actuate the spark plugs, fuel injectors, etc.

The computer 48 may be programmed to use the armature 28 and the first magnetic device 64 and/or the second magnetic device 65 to generate electricity while the vehicle 22 is powered by the engine 26, e.g., by controlling voltage and/or frequency of the electrical current provided to the induction coil 58 of the armature 28, the induction coil 68 of the first magnetic device 64, and/or the induction coil 69 of the second magnetic device 65, e.g., as described herein.

The computer 48 may be programmed to use the armature 28 and the first magnetic device 64 and/or the second magnetic device to function as a motor and provide additional power to the vehicle 22 while the vehicle 22 is powered by the engine 26, e.g., by controlling the voltage and/or frequency of an electrical current provided to the induction coil 58 of the armature 28, the induction coil 68 of the first magnetic device 64, and/or the induction coil 69 of the second magnetic device 65, e.g., as described herein.

The computer 48 may be programmed to operate the armature 28 and the first magnetic device 64 and/or the second magnetic device 65 the to power the vehicle 22 while operating the engine 26 at peak efficiency. For example, the engine 26 may convert fuel into kinetic energy at peak efficiency by maximizing a ratio of an amount of kinetic energy output by the engine 26 to an amount of potential energy in the fuel that is combusted to produce such kinetic energy. Peak efficiency may be at a target rotational speed of the driveshaft 50 of the engine 26, a target torque of the driveshaft 50 of the engine 26, a target spark plug timing, a target fuel injector timing, etc. Data indicating peak efficiency may be stored in the memory of the computer 48, e.g., upon manufacture of the system 20 and/or vehicle 22.

While actuating the engine 26 to operate at peak efficiency, as efficiency herein, the computer 48 may instruct the armature 28 and the first magnetic device 64 and/or the second magnetic device 65 to function as motor(s) or generator(s), as described herein, e.g., adding power to that provided by the engine 26 or converting a portion of the power provided by the engine 26 to electricity. For example, operation of the system 20 may be expressed by the following equation:

$$T_{target} - T_{engine} = T_{armature}$$

In the above equation, $T_{target}$ is a desired amount of torque to be provided to the wheel 36, e.g., as requested by an operator of the vehicle 22. $T_{engine}$ is an amount of torque provided by the engine 26, e.g., operating at peak efficiency. $T_{armature}$ is an amount of torque to added by the armature 28 and the first magnetic device 64 and/or the second magnetic device 65, e.g., by functioning as motor(s), or subtracted, e.g., by functioning as generator(s). To put it another way, when $T_{armature}$ is a positive number the computer 48 actuates the armature 28 and the first magnetic device 64 and/or the second magnetic device 65 motor(s), and when $T_{armature}$ is a negative number the computer 48 actuates the armature 28 and the first magnetic device 64 and/or the second magnetic device 65 to function as generator(s), e.g., as described herein.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a vehicle frame;
   a support arm pivotally supported by the vehicle frame;
   an engine supported by the support arm;
   an armature supported by the support arm; and
   a coupling device disposed around the armature and slidable, following actuation of an actuator, between a first position in which the coupling device couples the engine to the armature, and a second position in which the coupling device is uncoupled from the engine, the coupling device in the second position couples the armature to the support arm.

2. The system of claim 1, wherein the engine defines a notch, and the coupling device includes a tooth engaged with the notch when the coupling device is in the first position.

3. The system of claim 1, wherein the armature includes a spline and the coupling device is engaged with the spline to permit movement of the coupling device relative to the armature along an axial axis following the actuation of the actuator, and to inhibit movement of the coupling device relative to the armature in a rotational direction.

4. The system of claim 1, further comprising a magnetic device disposed around the armature.

5. The system of claim 4, wherein the magnetic device includes a permanent magnet.

6. The system of claim 4, wherein the magnetic device includes an induction coil.

7. The system of claim 4, further comprising a wheel rotatably supported by the support arm at a first end, wherein the magnetic device is fixed to the wheel and the support arm is pivotally supported by the vehicle frame at a second end of the support arm opposite the first end.

8. The system of claim 7, wherein the magnetic device is immovably fixed to the wheel.

9. The system of claim 7, further comprising a brake supported by the support arm and designed to restrict rotation of the wheel relative to the support arm.

10. The system of claim 9, further comprising a processor and a memory, the memory storing instructions executable by the processor to cause the actuation of the actuator for sliding the coupling device to the first position and to actuate the brake to an on state in which the brake inhibits rotation of the wheel.

11. The system of claim 10, wherein the memory stores instructions executable by the processor to actuate the armature to rotate when the brake is in the on state and the coupling device is in the first position.

12. The system of claim 10, wherein the memory stores instructions to actuate the engine to rotate when the brake is in the on state and the coupling device is in the first position.

13. The system of claim 1, wherein the armature includes a permanent magnet.

14. The system of claim 1, wherein the armature includes an induction coil.

15. A system comprising:
    a support arm;
    an engine supported by the support arm;
    an armature supported by the support arm; and
    a coupling device disposed around the armature and slidable, following actuation of an actuator, between a first position in which the coupling device couples the engine to the armature, and a second position in which the coupling device is uncoupled from the engine, the coupling device in the second position couples the armature to the support arm.

16. The system of claim 15, wherein the support arm defines a notch, and the coupling device includes a tooth engaged with the notch when the coupling device is in the second position.

17. The system of claim 15, wherein the coupling device is slidable, after the actuation of the actuator, to an intermediary position in which the coupling device is uncoupled from the support arm and the engine.

18. The system of claim 17, further comprising a processor and a memory, the memory storing instructions executable by the processor to actuate the engine and cause the actuation of the armature to rotate at a same speed when the coupling device is in the intermediary position.

19. The system of claim 18, wherein the memory stores instructions executable by the processor to cause the actuation of the actuator for sliding the coupling device to the first position when the engine and the armature rotate at the same speed.

* * * * *